(12) United States Patent
Ogura

(10) Patent No.: US 8,665,860 B2
(45) Date of Patent: Mar. 4, 2014

(54) RELAY DEVICE AND METHOD FOR CONTINUING SERVICE

(75) Inventor: Takao Ogura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 223 days.

(21) Appl. No.: 12/893,502

(22) Filed: Sep. 29, 2010

(65) Prior Publication Data

US 2011/0075652 A1 Mar. 31, 2011

(30) Foreign Application Priority Data

Sep. 30, 2009 (JP) ................................. 2009-227924

(51) Int. Cl.
*G06F 15/16* (2006.01)
(52) U.S. Cl.
USPC ........... 370/351; 709/229; 709/228; 709/226; 709/231; 709/232
(58) Field of Classification Search
USPC .......................... 709/226, 228, 229, 231, 232
See application file for complete search history.

(56) References Cited

U.S. PATENT DOCUMENTS

| | | | |
|---|---|---|---|
| 6,085,247 A | | 7/2000 | Parsons |
| 6,349,337 B1 | | 2/2002 | Parsons |
| 7,127,496 B2 * | | 10/2006 | Isozu et al. ..................... 709/217 |
| 7,454,462 B2 * | | 11/2008 | Belfiore et al. ............... 709/203 |
| 7,610,390 B2 * | | 10/2009 | Yared et al. .................... 709/229 |
| 7,716,333 B2 * | | 5/2010 | Bowman-Amuah .......... 709/226 |
| 7,831,712 B1 * | | 11/2010 | Masters ......................... 709/225 |
| 2006/0146767 A1 | | 7/2006 | Moganti |
| 2006/0264202 A1 * | | 11/2006 | Hagmeier et al. ............. 455/411 |
| 2010/0082979 A1 * | | 4/2010 | Edwards ........................ 713/168 |
| 2011/0007705 A1 * | | 1/2011 | Buddhikot et al. ........... 370/331 |

FOREIGN PATENT DOCUMENTS

| | | | |
|---|---|---|---|
| JP | 2004-163999 | * | 6/2004 |
| JP | 2006-191617 A | | 7/2006 |
| JP | 2008-102940 A | | 5/2008 |

OTHER PUBLICATIONS

Japanese Office Action mailed Mar. 5, 2013 for corresponding Japanese Application No. 2009-227924, with English-language translation.

* cited by examiner

*Primary Examiner* — Dang Ton
*Assistant Examiner* — Ronald H Davis
(74) *Attorney, Agent, or Firm* — Fujitsu Patent Center

(57) ABSTRACT

A relay device that relays a message transmitted from a terminal device to a server through a communications network. When a message is received from the terminal device, the relay device obtains attribute information related to the user of the terminal device, obtains an identifier to be inserted into a message to the terminal device by a server that generated a session in response to the message from the terminal device, the identifier being for identifying the session, stores the obtained identifier that is associated with the attribute information, determines whether or not the attribute information coincident to the attribute information obtained by receiving the message from the terminal device is to be stored when a message was received from the terminal device, inserts the identifier associated with the attribute information into the message received from the terminal device when the coincident attribute information is stored, and relays the message.

8 Claims, 17 Drawing Sheets

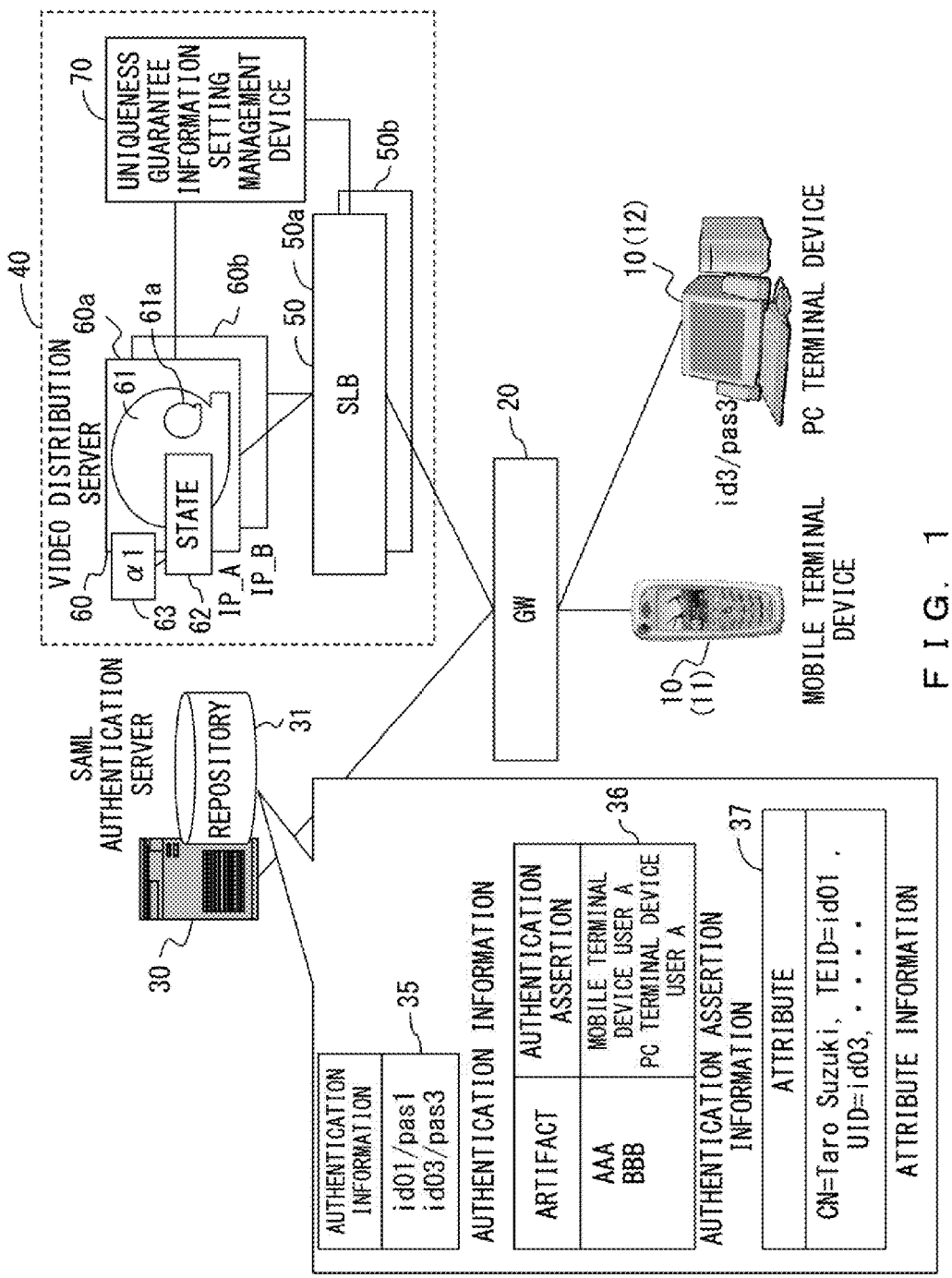
F I G. 1

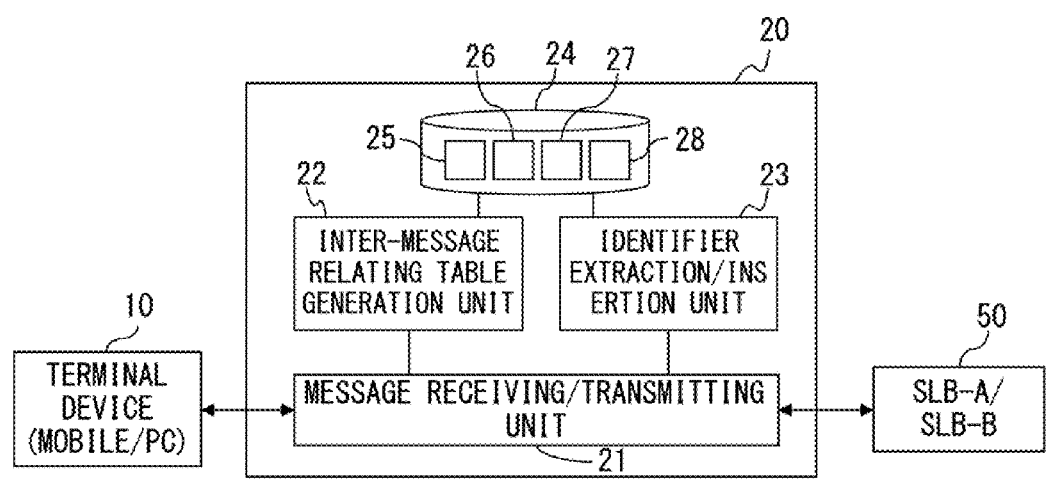
F I G. 2

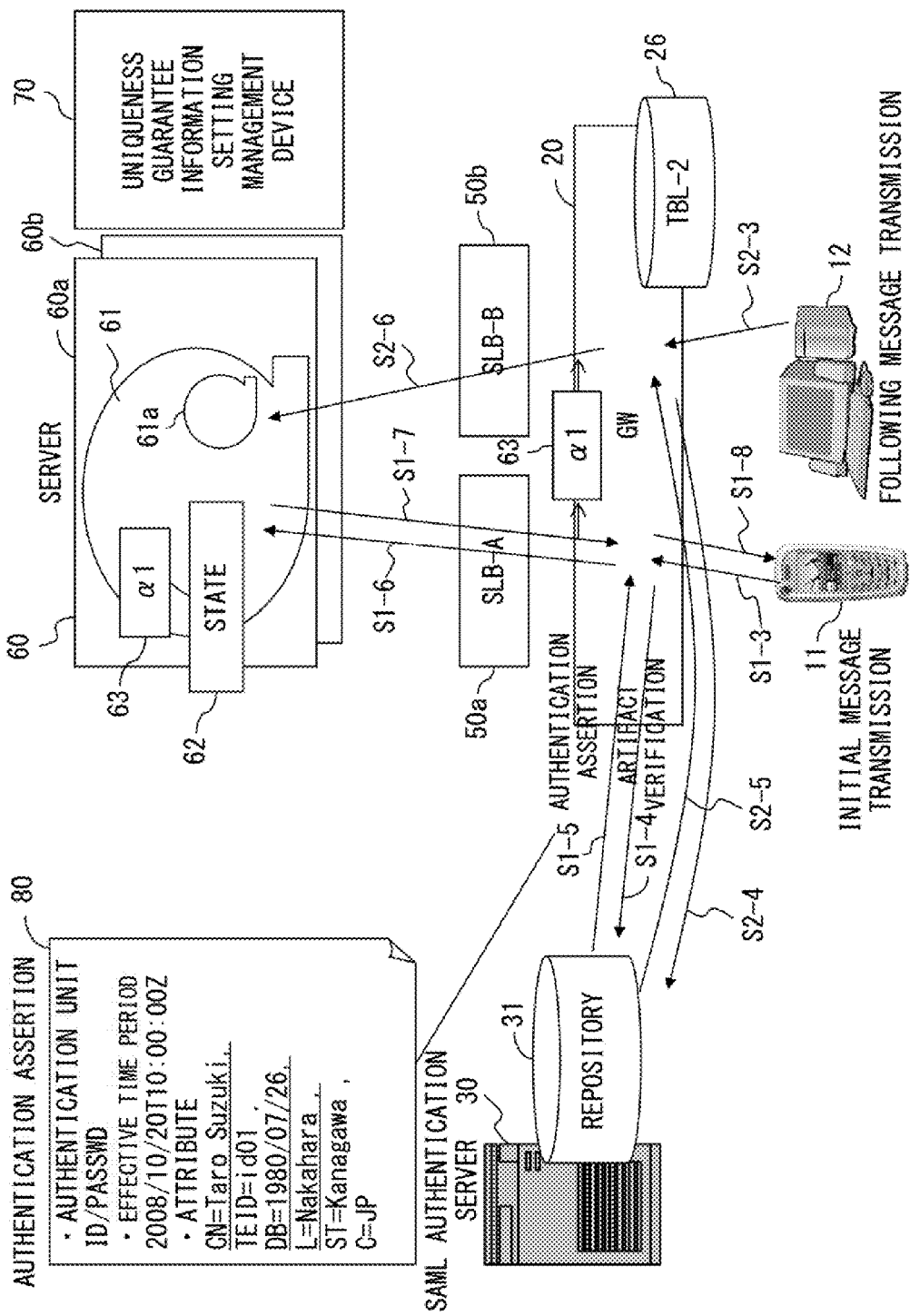
F I G. 4

| SERVICE NAME | ATTRIBUTE TYPE INFORMATION |
|---|---|
| movie | CN, DB, L |
| Tvconference | OG, OU, O, C |

FIG. 6

F I G. 7A
BEFORE GENERATING ENTRY
| SERVICE NAME | ATTRIBUTE INFORMATION | IDENTIFIER INFORMATION |
|---|---|---|
| | | |
F I G. 7B
GENERATING ENTRY
| SERVICE NAME | ATTRIBUTE INFORMATION | IDENTIFIER INFORMATION |
|---|---|---|
| movie | CN=Taro Suzuki, DB=1980/07/26, L=Nakahara | |
F I G. 7C
DETERMINING IDENTIFIER
| SERVICE NAME | ATTRIBUTE INFORMATION | IDENTIFIER INFORMATION |
|---|---|---|
| movie | CN=Taro Suzuki, DB=1980/07/26, L=Nakahara | Abc123・wxc |

| HEADER VALUE | | | | |
|---|---|---|---|---|
| IP HEADER VALUE | | MESSAGE HEADER VALUE | | PROTOCOL/SERVICE NAME |
| Protocol ID | RECEIVING PORT | Request-URI | Route | |
| tcp | 80 | /movie | - | HTTP/movie |
| tcp | 80 | /conference | - | HTTP/TVconference |
| udp | 5060 | - | sip:192.168.0.100:5060 | SIP/movie |
| ... | ... | ... | ... | ... |

F I G. 8

| SERVICE NAME | PROTOCOL | FORMAT | SESSION POSITION |
|---|---|---|---|
| movie | HTTP | HTTP/1.1 | Cookie FIELD, "session= " |
| | SIP | SIP/2.0 | Cookie FIELD, "session= " |
| TVconference | HTTP | HTTP/1.1 | Cookie FIELD, "session= " |
| | .... | .... | ..... |

F I G. 9

```
<samlp:Request
 Major Version= ïgïh
   . . . .
Xmlns:xsi= "http://www.w3.org/2001/XMLSchema-instance" >
 <samlp:AssertionArtifact>
 BBB
</samlp:AssertionArtifact>
</samlp:Request>
```

F I G. 1 0 A

```
<samlp:Responce
Major Version= ·g1h
. . . .
Xmlns:xsi= "http://www.w3.org/2001/XMLSchema-instance" >
. . . .
<saml:Assertion>
. . . .
<saml:AuthenticationStatement>
  <Subject>
    <NameIdentifier
      SecurityDomain = ·gbbb.co.jp·h
      Name=·gTaro Suzuki·h />
  </NameIdentifier>
</Subject>
. . . .
<Attribute AttributeName=·gdate_of_birth·h AttributeNameSpace·hhttp://bbb.co.jp/date_of_birth·h>
  <AttributeValue>
    1980/07/26
  </AttributeValue>
</Attribute>
<Attribute AttributeName=·glocation·h AttributeNameSpace·hhttp://bbb.co.jp/location·h>
  <AttributeValue>
    Nakahara
  </AttributeValue>
</Attribute>
</saml:AuthenticationStatement>
</saml:Assertion>
</samlp:Responce>
```

FIG. 10B

```
.....
<saml:AttributeQuery>
 <Subject>
  <SubjectConfirmation>
   .....
  <SubjectConfirmation>
 </Subject>
 <AttributeDesignator>
  <Attribute AttributeName="date_of_birth" AttributeNameSpace"
http://bbb.co.jp/date_of_birth" >
  </Attribute>
  <Attribute AttributeName="location" AttributeNameSpace" http://bbb.co.jp/location" >
  </Attribute>
 </AttributeDesignator>
</saml:AttributeQuery>
.....
```

FIG. 11A

```
.....
<saml:AttributeStatement>
  <Subject>
    <NameIdentifier
     SecurityDomain = "bbb.co.jp"
     Name= "Taro Suzuki" />
  </NameIdentifier>
  </Subject>
  <Attribute AttributeName= "date_of_birth" AttributeNameSpace" http://bbb.co.jp/date_of_birth" >
    <AttributeValue>
     1980/07/26
    </AttributeValue>
  </Attribute>
  <Attribute AttributeName= "location" AttributeNameSpace" http://bbb.co.jp/location" >
    <AttributeValue>
     Nakahara
    </AttributeValue>
  </Attribute>
</saml:AttributeStatement>
.....
```

FIG. 11B

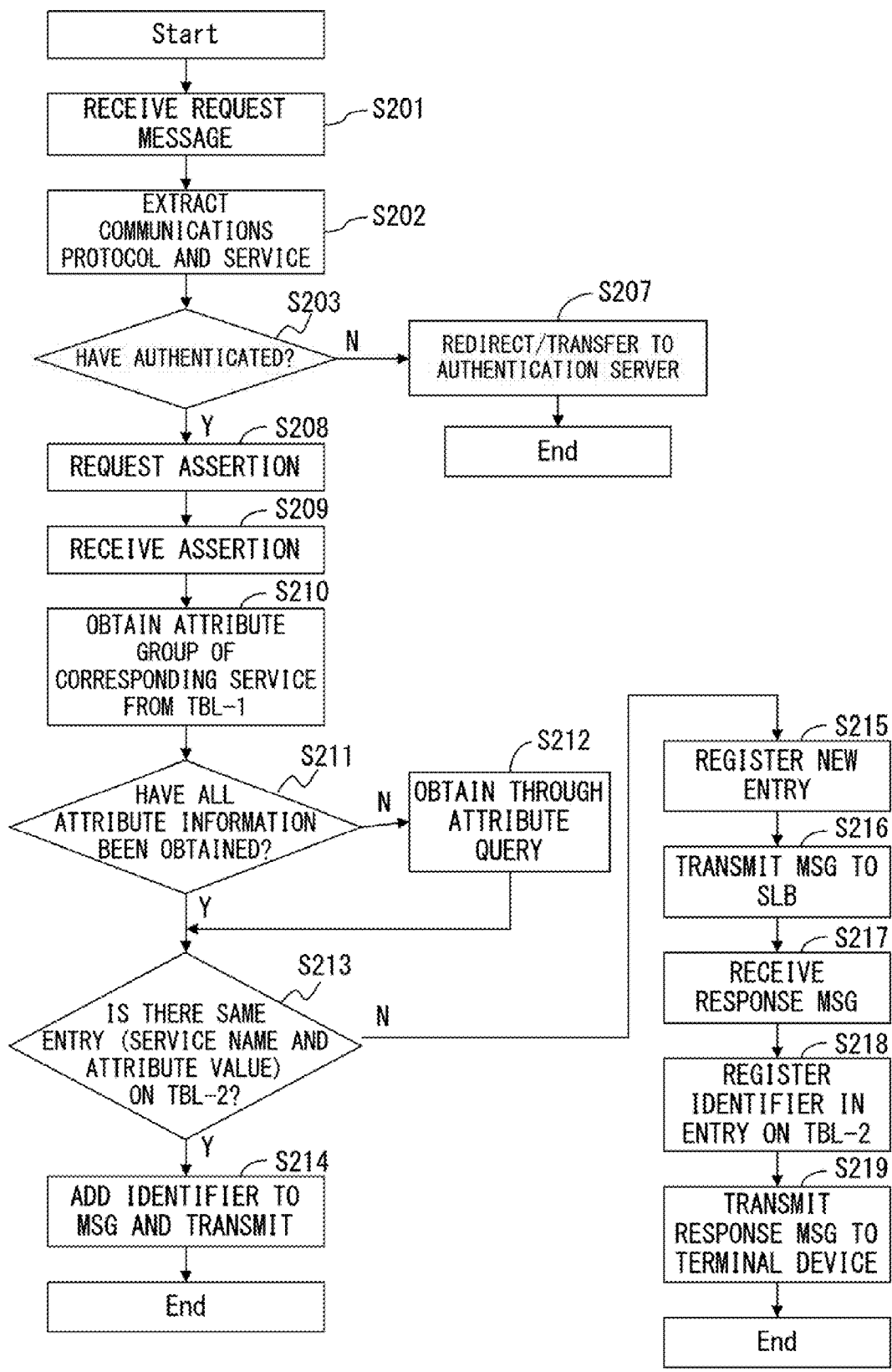
F I G. 14

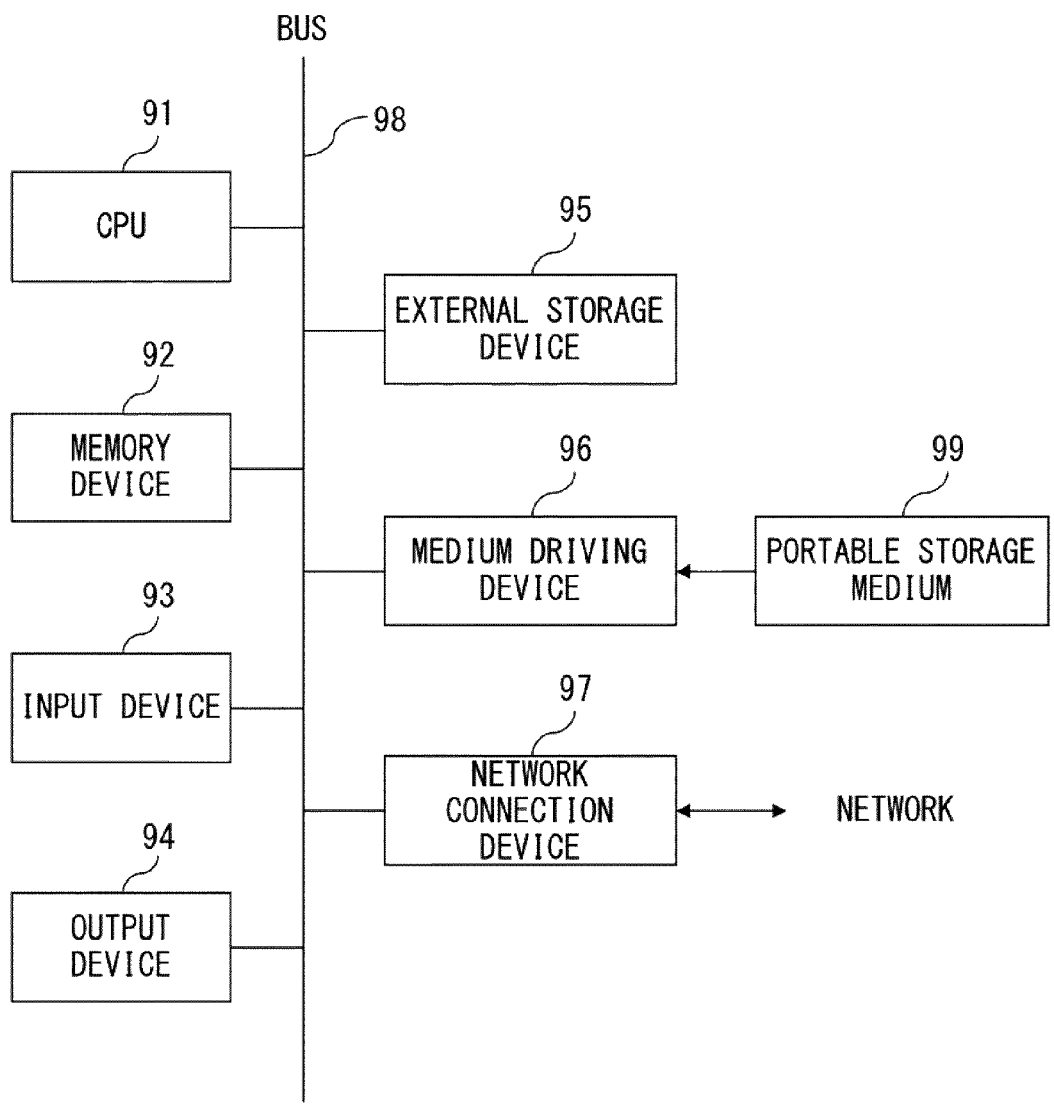
F I G. 1 5

RELAY DEVICE AND METHOD FOR CONTINUING SERVICE

CROSS-REFERENCE TO RELATED APPLICATIONS

This application is based upon and claims the benefit of priority of the prior Japanese Patent Application No. 2009-227924, filed on Sep. 30, 2009, the entire contents of which are incorporated herein by reference.

FIELD

The embodiments discussed herein are related to a technology by which a server provides, through a communications network, services to a user using a terminal device.

BACKGROUND

Today, communications networks, represented by the Internet, have become widespread in society. Thus, various services have started to be provided, by using servers, to users of terminal devices as clients connected to such communications networks.

A server for providing services generates sessions based on messages received from terminal devices, and provides services to the users of such terminal devices. This session corresponds to units in which servers provide services to one terminal device. A server that has generated this session inserts an identifier for identifying the generated session into a message as a response to the terminal device and sends the message. After that, the terminal device that has received the message into which the identifier has been inserted transmits, to the server, a message into which that the identifier has been inserted. Thereby, the server can continue to provide services on the basis of the identifier in the message received from the terminal device.

Services to be provided through communications networks are usually based on an assumption that many people use those services. The more users there are, the greater the load a server receives. Accordingly, a service provider prepares plural servers so as to employ a system configuration by which load distribution is performed so that the user of a terminal device is assigned one of such servers to get services. This load distribution is usually performed by using an SLB (Server Load Balancer).

An SLB stores relationships between identifiers and servers for holding sessions to which those identifiers are assigned. Thereby, having received a message into which an identifier is inserted from a terminal device, an SLB confirms whether it holds a relationship having that identifier, and determines the sorting destination of the message on the basis of the confirmation result. When the relationship having the identifier is held, the determined sorting destination is the server specified by the relationship, and when a relationship having the identifier is not held, the destination is a server selected by the autonomous sorting algorithm, such as a round-robin algorithm or the like. By determining a sorting destination as described above, an SLB realizes the uniqueness guarantee, by which related messages transmitted from the same terminal device are sorted to the same server. The function that realizes this uniqueness guarantee is referred to as a uniqueness guarantee function (or a session maintaining function). Relationships used in realizing this uniqueness guarantee are referred to as "uniqueness guarantee information" hereinafter. Messages sorted by an autonomous sorting algorithm, i.e., messages as triggers for the server to generate sessions, are referred to as "initial messages" hereinafter.

In recent years, mobile phones have been realizing many functions, and many of them can be used as terminal devices. Personal computers (PCs) have been becoming inexpensive, and there are many cases where a single person owns plural PCs. In this situation, many users can use more than one terminal device.

When a user uses a service while changing terminal devices, the message transmitted first from each terminal device is processed by the server as the initial message. When the initial messages are processed as above, the service that has been used by one terminal device cannot be continuously used by another terminal device. However, users sometimes desire to continue to use the same service while changing from one terminal device to another terminal device (between plural terminal devices). For example, when a user is receiving a service of distributing videos and the user has changed terminal devices, that user sometimes desires to continue to view only portions of the video that the user has not viewed yet. In this situation today, a technique by which the same service can be continuously used via different terminal devices has been developed. This technique is referred to as a "service continuation technique" hereinafter.

As examples of conventional service continuation techniques, there are techniques disclosed in Japanese Laid-open Patent Publication No. 2006-191617 (hereinafter, document 1) and Japanese Laid-open Patent Publication No. 2008-102940 (hereinafter, document 2). In the conventional service continuation technique disclosed in Patent Document 1, a device dedicated to realizing service continuation is prepared, and information about sessions (session information) is recorded in that dedicated device. By using the recorded session information, it is made possible to continue the service in another terminal device. In this manner, the dedicated device is used for permitting different terminal devices to have session information in common. The dedicated device performs communications with terminal devices so as to acquire, update, or provide session information.

In the conventional service continuation technique disclosed in Patent Document 2, a server that provides services receives identification information (user ID) input to a terminal device by a user, and determines whether there is an existing session that relates to the information. The server generates a new session or relates the information to an existing session again in accordance with the determination result. By relating the information to an existing session again, the user can continuously use the service through a different terminal device.

Preparation of a dedicated device increases the cost for providing services, or increases the financial burden on users. In addition, terminal devices (or programs executed by such terminal devices) have to be compatible with the dedicated devices. To obtain this compatibility, users of terminal devices are forced to perform complicated operations and the like. Because of this, the conventional service continuation technique in Patent Document 1 is not desirable.

According to the conventional service continuation technique in Patent Document 2, an increase in cost and financial burden on users can be suppressed. However, servers have to extract related sessions from among existing sessions in response to the reception of identification information. This increases the load on the servers. This increase in load leads to a deterioration in the quality of services, or an increase in the number of servers required. The more users there are, the more serious the load increase becomes. Services provided through communications networks are assumed to be used by many people. Thus, it is desirable to suppress the load on a server.

As described above, when a system is assumed to be used by many people, the service provider side usually prepares plural servers so as to employ a system configuration in which an SLB automatically sorts messages. The conventional service continuation technique disclosed in Patent Document 2 cannot be compatible with the above system configuration because an SLB for automatically sorting messages cannot identify the server to transmit a message to on the basis of identification information (user ID) input by users. Because of this, it is important, in continuous use of a service by different terminal devices, to be able to be compatible with a system configuration that uses an SLB, i.e., the automatic sorting of messages, in addition to suppression of an increase in the load on the servers.

SUMMARY

According to an aspect of an embodiment of the invention, a relay device that relays a message transmitted from a terminal device to a server through a communications network includes an attribute information obtaining unit configured to obtain attribute information related to a user of the terminal device from which the message was received; an identifier obtaining unit configured to obtain an identifier to be inserted into a message to the terminal device by a server that generated a session in response to the message from the terminal device, the identifier being for identifying the session; an information storage unit configured to store the identifier that is obtained by the identifier obtaining unit and that is associated with the attribute information obtained by the attribute information obtaining unit; a determination unit configured to determine whether or not the information storage unit stores attribute information coincident to the obtained attribute information when the attribute information obtaining unit obtained attribute information; an identifier insertion unit configured to insert an identifier associated with the attribute information into a message that triggered obtainment of attribute information by the attribute information obtaining unit when the determination unit determined that the information storage unit stores attribute information coincident to the attribute information obtained by the attribute information obtaining unit; and a relay unit configured to transmit a message into which the identifier insertion unit inserted an identifier.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 illustrates a configuration of a service provision system constructed by using a relay device according to the present embodiment;

FIG. 2 illustrates a functional configuration of a GW device 20 as a relay device according to the present embodiment;

FIG. 4 is a sequence diagram illustrating exemplary operations of the mobile terminal device, the PC, each SLB, the SAML authentication server, and the video distribution server;

FIG. 6 illustrates a data configuration of an attribute type information table;

FIG. 7A illustrates a data configuration of an attribute/identifier information table, and procedures of storing data in an entry;

FIG. 7B illustrates a data configuration of an attribute/identifier information table, and procedures of storing data in an entry;

FIG. 7C illustrates a data configuration of an attribute/identifier information table, and procedures of storing data in an entry;

FIG. 8 illustrates a data configuration of a service name extraction table;

FIG. 9 illustrates a data configuration of a session position extraction table;

FIG. 10A illustrates an exemplary syntax of an authentication query request;

FIG. 10B illustrates an exemplary syntax of an authentication assertion;

FIG. 11A illustrates an exemplary syntax of an attribute query request;

FIG. 11B illustrates an exemplary syntax of an attribute assertion;

FIG. 14 is a flowchart of a message relay process; and

FIG. 15 illustrates an example of a hardware configuration of a computer to which the present embodiment can be applied.

DESCRIPTION OF EMBODIMENTS

Figure 3:
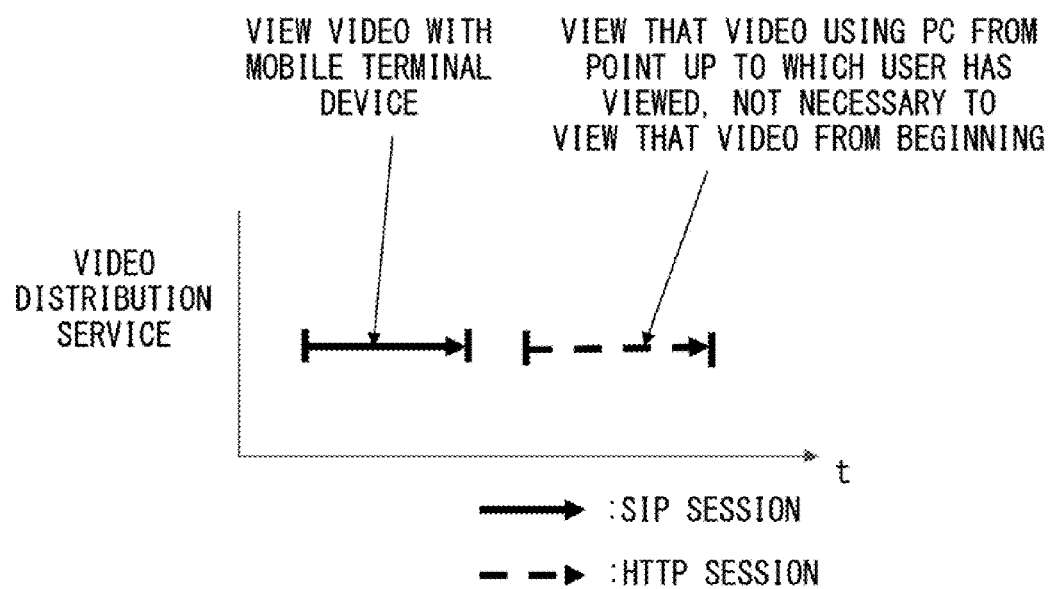
FIG. 3 is a timing chart of an example of using a video distribution service after changing a terminal device to a different terminal device.

Hereinafter, detailed explanations will be given for embodiments of the present invention by referring to the drawings.

FIG. 1 illustrates a configuration of a service provision system constructed using a relay device according to the present embodiment. This service provision system has been constructed in order to provide services to the user of terminal devices 10, who is a client connected to the service through a communications network (not illustrated). In FIG. 1, as the terminal devices 10, an easy to carry mobile terminal device 11 such as a mobile phone, a PDA, a notebook computer, or the like, and a PC 12, which is a desktop type or a notebook type computer that is not usually carried, are illustrated. The terminal device 10 is not limited to these examples, and a television that can perform communications via communications networks, a car navigation device, or the like can also be used as the terminal devices 10. In this example, it is assumed that only the mobile terminal device 11 and the PC 12 are the terminal devices 10, for descriptive purpose. The expressions "mobile terminal device 11" and "PC 12" are used only when they have to be distinguished from each other as the terminal devices 10. When they do not have to be distinguished from each other, they are referred to as "terminal device 10".

The service provision system includes a GW (GateWay) device 20, an SAML (Security Assertion Markup Language)

authentication server 30, and a service processing system 40. A relay device according to the present embodiment is implemented as the GW device 20.

As is well known, an SAML is a specification for safely exchanging authentication information such as an ID or password. The SAML authentication server 30 uses authentication information transmitted from the terminal device 10 so as to perform authentication, and when by the result of the authentication the user of the terminal device 10 is confirmed to be a person registered as the account holder, the SAML authentication server 30 issues an artifact (authentication information) which indicates that authentication has been made.

An artifact realizes GSSO (Global Single Sign On), which allows access to other sites. The SAML authentication server 30 issues the assertion identified from that artifact. GSSO is realized when another site trusts this assertion so as to regard the assertion as having been authenticated. According to the SAML specification, there are three types of assertions i.e., an authentication assertion that functions as a message for transmitting information about authenticated users, an attribute assertion for transmitting such users' attribute information, and an authentication determination assertion for indicating whether or not a user (subject) is allowed to access a particular resource.

As described above, the SAML authentication server 30 is prepared for realizing GSSO. This server is not an essential constituent for a service provision system because the result of authentication is available on plural sites. The SAML authentication server 30 may be provided at a different site, or plural SAML authentication servers 30 may be provided at plural sites, respectively. For descriptive purpose, there is only one SAML authentication server 30.

The SAML authentication servers 30 include a repository 31 for authentication. This repository 31 is, for example, an auxiliary storage device or a storage device connected thereto. The repository 31 stores an authentication information database (DB) 35, an authentication assertion information table 36, and an attribute information DB 37.

The authentication information database (DB) 35 stores authentication information for each person registered as an account holder. The expression "id01/pas1" in FIG. 1 represents the ID/password stored as authentication information. In this example, ID/password is used as the authentication information.

The confirmation of whether or not a user has been authenticated is performed on the basis of whether or not the SAML authentication server 30 has issued the assertion on the basis of an artifact. The authentication assertion information table 36 is a table for managing correspondence between issued artifacts and assertions to which those artifacts were assigned. The expressions "AAA" and "MOBILE PHONE user A" in the entries (records) in FIG. 1 indicate that the artifact of "AAA" was issued on the basis of the authentication made by user A who is using the mobile terminal device 11. In reality, one entry stores an artifact, such as an authentication assertion to which that artifact was assigned, and storage location information, which represents where each attribute assertion is stored. The SAML authentication server 30 adds an entry (record) to the authentication assertion information table 36 each time it performs authentication.

The attribute information DB 37 is a table that stores attribute information related to a person registered for each account. The expression "CN=Taro Suzuki, TEID=id01, UID=id03" in an entry in FIG. 1 indicates that the full name (CN) is Taro Suzuki, the ID of the mobile terminal device 12 (terminal ID) is id01, and the ID of the PC 12 is id03. Other examples of attribute information include birthday (DB), city name (L), prefecture name (ST), country name (C), and the like. For a person who belongs to a group, attribute information further includes the name of the group (OG), the name of the organization (OU), and the type of occupation (O). The authentication assertion and the attribute assertion are generated from the attribute information extracted from the attribute information DB 37.

The GW device 20 is connected to the terminal device 10 via a communications network (not illustrated), and relays messages transmitted from the terminal device 10. Messages related to the provision of services are transferred to a service processing system 40. Thereby, the service processing system 40 processes messages, and realizes the provision of services desired by the user of the terminal devices 10.

The service processing system 40 includes an SLB 50 prepared for, for example, each communications protocol, a plurality of video distribution servers 60 that provide plural services such as video distribution services or the like, and a uniqueness guarantee information setting management device 70 that manages the setting of the uniqueness guarantee information to the SLB 50.

In FIG. 1, as the SLB 50, two SLBs are illustrated with the symbols 50a and 50b. Also, as the video distribution servers 60, two servers are illustrated with the symbols 60a and 60b. Similarly to the case of the terminal devices 10, the symbols 50a, 50b, 60a, and 60b are used only when they have to be distinguished from each other.

Each of the video distribution servers 60 executes an application program (simply referred to as an "application" hereinafter) 61 so as to provide a service to the user of the terminal devices 10. The video distribution server 60 that has received a message (initial message) from the terminal device 10 of a user who has not received a service generates a state 62, and assigns to the state 62 an identifier 63 that allows the state 62 to be identified uniquely. The expression "α1" in FIG. 1 represents the identifier 63.

The above service is related to video distribution. Forms of services are not particularly limited. However, for descriptive purposes in this example, the services are assumed to be video distribution services such as of movies, television programs, or the like, and TV conference service, by which video and audio are distributed for television conferences. Services are provided by execution of situation-responded processes by the application 61. The state 62 is generated for executing situation-responded process. Accordingly, the state 62 is information that exists only when a session is maintained and represents the situation in addition to the existence of the session.

Having generated the state (session) 62, the application 61 stores data related to that session (session data). This session data includes the identifier 63 and data associated with the session. The application 61 includes a session information monitoring/reporting unit 61a. This session information monitoring/reporting unit 61a monitors a generation of sessions by the application 61, and reports to the uniqueness guarantee information setting management device (simply referred to as a "setting management device" hereinafter") 70 information related to generated sessions. This session information includes at least the identifier 63.

A SLB 50 is prepared for each communications protocol. An initial message is transferred by one SLB 50 to one video distribution server 60, and that video distribution server 60 transmits, as a response, to that SLB 50 a message into which the identifier 63 has been inserted. Accordingly, uniqueness guarantee information, which is for transferring related messages transmitted from the same terminal device 10 to the same video distribution server 60, is usually set only in the SLB 50 that transferred the initial message. However, when uniqueness guarantee information is set in the above manner, it is not guaranteed that a message transmitted from the terminal device 10 with a different communications protocol will be transferred to the right video distribution server 60. In the present embodiment, such changes in communications protocol can be responded to by the setting management device 70.

The setting management device 70 receives session information from the video distribution server 60, and uses that session information so as to generate uniqueness guarantee information to be set in the SLB 50 that has not transferred an initial message, and transmits the generated uniqueness guarantee information to that SLB 50. Thereby, uniqueness guarantee information is also registered in the SLB 50 that has not transferred an initial message, and uniqueness guarantee information that permits cooperation between plural communications protocols is realized. In the present embodiment, uniqueness guarantee information is also registered in the SLB 50 that has transferred an initial message.

The uniqueness guarantee information indicates relationships between the identifiers 63 assigned to the states (sessions) 62 and the video distribution servers 60 that generated the states 62. Information specifying the video distribution servers 60 is, for example, addresses and unique identifiers assigned to the respective video distribution servers 60.

Messages from the video distribution servers 60 are transmitted to the GW device 20 via the SLBs 50. However, such messages may be transmitted to the terminal device 10 without being relayed by the SLB 50 or the like. When a message is transmitted in this manner, the setting management device 70 registers uniqueness guarantee information in each SLB 50. The registration of uniqueness guarantee information may be performed by the video distribution server 60 that generated the session. The setting management device 70 is prepared for setting uniqueness guarantee information in order to suppress the load on the respective servers 60.

A situation can be expected to arise where a user who can use the mobile terminal device 11 and the PC 12 uses a service through the mobile terminal device 11 when he or she is out of the house and uses that service through the PC 12 when he or she has returned home. The opposite situation can also be expected to arise. In either situation, in video distribution services, there is a low possibility that a user will desire to view a video from the beginning after changing the terminal devices 10. This is because it is expected that a user who has viewed a video will desire to view the next scene of the video and to restart viewing exactly immediately from the point up to which he or she has viewed. Thus, in the present embodiment, it is made possible to continuously use a service between different terminal devices 10.

FIG. 3 is a timing chart of an example in which one terminal device 10 has been using a video distribution service, and thereafter the terminal device 10 is changed into another terminal device 10 to use the video distribution service. In the example illustrated in FIG. 3, the mobile terminal device 11 first uses a video distribution service, and thereafter that video distribution service is used continuously via the PC 12. As the communications protocols, the mobile terminal device 11 and the PC 12 use SIP (Session Initiation Protocol) and HTTP (HyperText Transfer Protocol), respectively. Hereinafter, for descriptive purposes, the only protocols that are used respectively by the mobile terminal device 11 and the PC 12 are assumed to be SIP and HTTP. It is assumed that SLB 50a is exclusively for SIP, and that SLB 50b is exclusively for HTTP.

Messages from the terminal devices 10 are sorted by the SLBs 50 that are compatible with the communication protocols of those messages. The sorting is performed by referring to registered uniqueness guarantee information when the identifiers 63 of the state 62 were extracted from the messages. In the present embodiment, attention is paid to this fact, and it is made possible to use a service continuously between two different terminal devices 10 by extracting a message into which the identifier 63 is to be inserted from among messages transmitted from the terminal devices 10, and inserting the identifier 63 into the extracted message. The extraction of a message and insertion of the identifier 63 into the extracted message are performed by the GW device 20.

When the identifier 63 is inserted into a message as described above, the SLB 50 can identify, from the identifier 63, the video distribution server 60 to which the message has to be transferred. The video distribution server 60 can process messages into which the identifiers 63 have been inserted by the GW device 20, in the same manner that it has processed previously received messages. Therefore, it is made possible for different terminal devices 10 to use the same service continuously without modifying the service process system 40 side. The increase in load on the video distribution servers 60 can be avoided or can be suppressed. These facts are also reasons for making the GW device 20 realize the continuous use of a service.

FIG. 2 illustrates a functional configuration of the GW device 20, which serves as a relay device according to the present embodiment. As illustrated in FIG. 2, this GW device includes a message receiving/transmitting unit 21, an inter-message relating table generation unit 22, an identifier extraction/insertion unit 23, and a storage unit 24. The storage unit 24 stores an attribute type information table 25, an attribute/identifier information table 26, a service name extraction table 27, and a session position extraction table 28.

The GW device 20 receives a message that the video distribution server 60 has transmitted to the terminal devices 10 via the SLB 50, and extracts the identifier 63 in that message so as to store the identifier 63. The attribute information related to the user of the terminal devices 10 is associated with the identifier 63. The attribute information is not changed as long as the user is not changed even when the terminal device 10 being used is changed into another terminal device 10. Accordingly, the attribute information is used both for identifying the message into which the identifier 63 has to be inserted from among messages transmitted from the terminal device 10 and for the identifier 63 that has to be inserted into the message.

The use of a service provided by the video distribution server 60 is based on the authentication by the SAML authentication server 30. Accordingly, attribute information related to the user of the terminal devices 10 can be obtained from the SAML authentication server 30. This means that necessary attribute information can be obtained without installing in the terminal devices 10 a new function for transmitting information for identifying users, such as attribute information or the like. Another reason for associating the attribute information with the identifier 63 is that this eliminates the need to add a new function on the side of the terminal device 10. Attribute information may be obtained in a manner other than a manner in which authentication results are used.

Tables 25 through 28 stored in the storage unit 24 are used for inserting identifiers 63 into messages as described above. Before explaining units 21 through 23, these tables 25 through 28 will be explained specifically by referring to FIGS. 6 through 9.

FIG. 6 illustrates a data configuration of the attribute type information table 25. This attribute type information table 25 holds types of attributes used for identifying users for each service (video distribution service and TV conference service in this example) that the video distribution server 60 can provide. The attribute type information corresponds to a group of types of attributes, i.e., a combination of attributes. In FIG. 6, "movie" and "TV conference" mean a video distribution service and a TV conference service, respectively. As described above, "CN", "DB", "L", "OG", "OU", "O", and "C" represent full name, birthday, name of city, name of group, name of organization, type of occupation, and name of country, respectively.

As illustrated in FIG. 6, attribute information, i.e., combinations of attributes for identifying users, varies from service to service. This is because different services are provided to different people. Video distribution services target individuals while TV conference services target plural people. Accordingly, in video distribution services, attribute information related to users themselves is used for identifying the users, and in TV conference services, attribute information related to organizations of users is used for identifying the users.

FIG. 8 illustrates a data configuration of the service name extraction table 27. This service name extraction table is a table for identifying the protocol of a message transmitted from the terminal devices 10 and the requested service on the basis of the message. In FIG. 8, the communications protocol and the service are identified in the manner described below. "HTTP/movie", "HTTP/TVconference", and "SIP/movie" in FIG. 8 represent a video distribution service provided using HTTP, a TV conference service provided using HTTP, and a video distribution service provided using SIP, respectively.

A message includes an IP header, a header corresponding to the communications protocol, and a body corresponding to the communications protocol. "IP header value" and the "message header value" in FIG. 8 are items representing the field values to be extracted from the IP header and the header corresponding to the communications protocol, respectively. Thereby, these item names are disposed below the item "header value". For a header corresponding to the communications protocol and the body, a description attached with names of the communications protocols are used, such as "SIP header" or "HTTP header".

The item "IP header value" is used for identifying the communications protocol. "80" and "5060" in the column of the item "receiving port" in the item. "IP header" represent the port numbers that the video distribution server 60 uses for receiving messages. In other words, the video distribution server 60 uses the ports with the numbers "80" and "5060" respectively for receiving messages based on HTTP and SIP. Thus, in the present embodiment, the communications protocol used by a message is identified from the port number in the IP header. "tcp" and "udp" described as values in the item "Protocol ID" represent the identifiers 63 assigned to HTTP and SIP. Port numbers are sub-addresses assigned to a lower rank of the IP addresses.

Figure 12B:
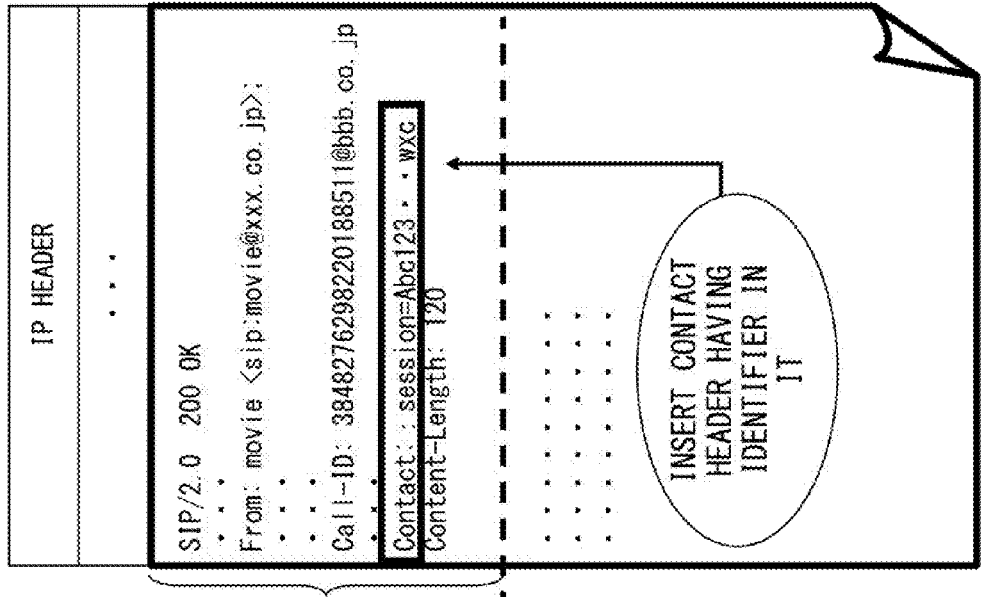
FIG. 12B illustrates an example of a SIP message.
Figure 12A:
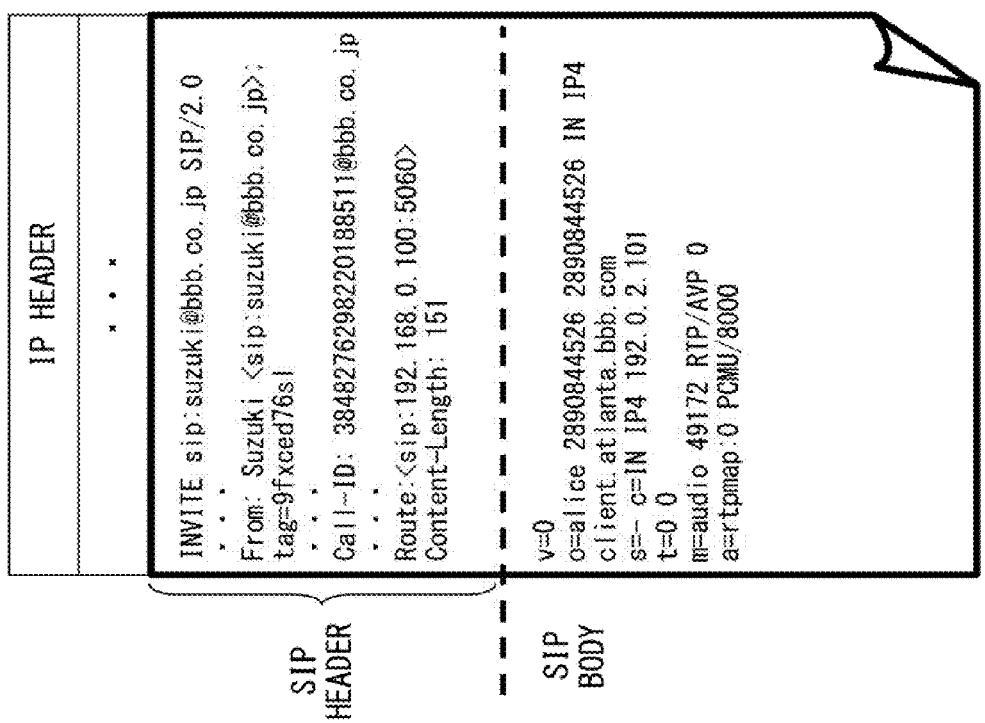
FIG. 12A illustrates an example of a SIP message.
Figure 13:
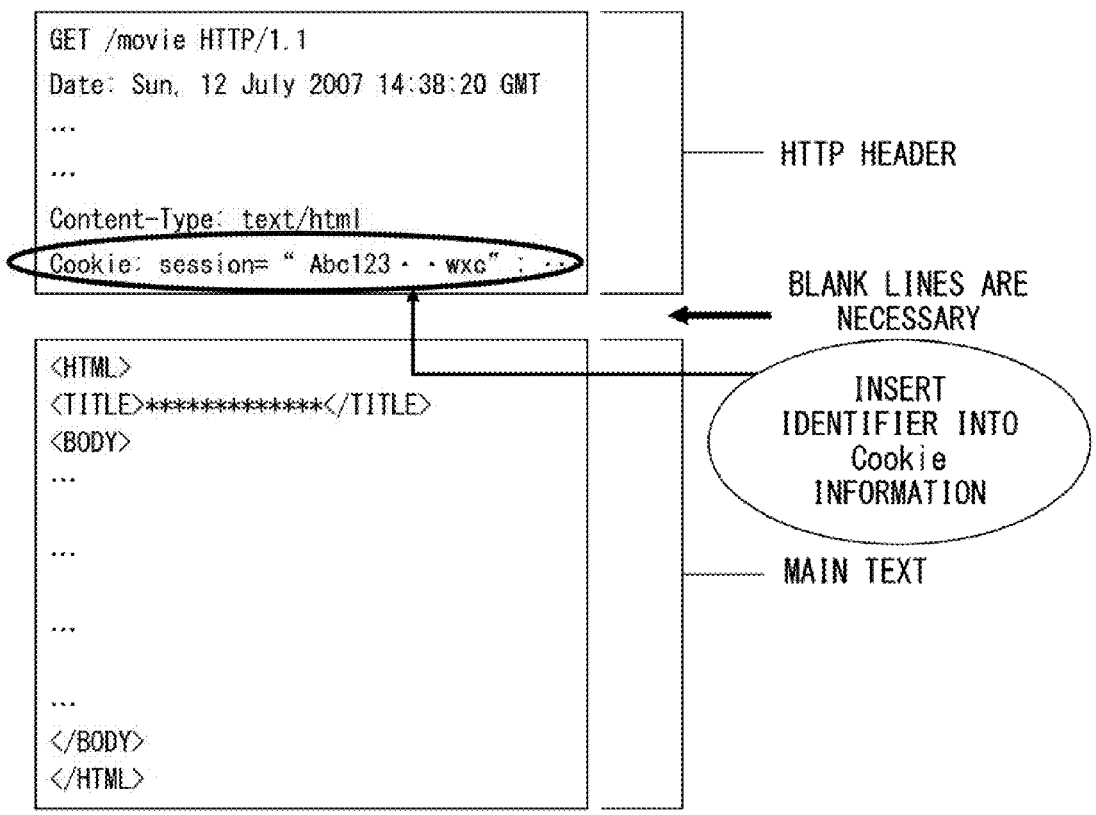
FIG. 13 illustrates an example of an HTTP message.

As illustrated in FIGS. 12A, 12B, and 13, the configurations of the header corresponding to the communications protocol and body vary depending upon the communications protocol. The item "message header value" is used for identifying a service from the header corresponding to the communications protocol. Specifically, "/movie" and "/conference" in the column of the item "Request-URI" in the item "Message header value" represent character strings that are identified as a video distribution service and a TV conference service, respectively. These character strings are character strings described as a GET method in an http header as illustrated in, for example, FIG. 13. Accordingly, the item "Request-URI" is used for identifying a service requested by an http message.

The item "Route" is used for identifying a service requested by an SIP message. The expression "SIP: 192.168.0.100:5060" in the column of that item represents character strings identified as a video distribution service. This character string is described as a field value in the Route header of an SIP header in a request message based on SIP as illustrated in FIG. 12A.

FIG. 9 illustrates a data configuration of the session position extraction table 28. This session position extraction table 28 is a table for identifying, for each service, the position (session position) at which the identifier 63 of the state (session) 62 is inserted into a message. The session position is defined for each communications protocol. A session position does not vary depending upon the types of services as long as the communications protocol remains the same. In an http message, the session positions are Cookie fields in the http headers as illustrated in FIG. 13. In an SIP message, the session positions are Contact fields in SIP headers as illustrated in FIG. 12B. The identifier 63 is described following "session=". Thus, the session position extraction table 28 is used not only for extracting the identifiers 63 from messages (response messages) transmitted from the video distribution server 60, but also for inserting the identifiers 63 into the messages transmitted from the terminal devices 10. The SIP message illustrated in FIG. 12B is a response message transmitted in response to the request message illustrated in FIG. 12A.

FIGS. 7A through 7C illustrate data configurations of the attribute/identifier information table 26, and procedures of storing data in entries. This table 26 is used for inserting the identifier 63 into the message into which the identifier 63 is to be inserted, from among messages transmitted from the terminal devices 10.

An entry (record) is registered for each service requested by the user of the terminal devices 10. In one entry (record), the service name, attribute information, and identifier information are stored. The service name represents the type of service requested by the user of the terminal devices 10, and the identifier information represents the identifier 63 of the state (session) 62 that has been generated by the request for the service. As the attribute information, a combination of attribute information corresponding to the type of that service is stored.

Use of a service provided by the video distribution server 60 requires authentication by the SAML authentication server 30. This means that an initial message with which the video distribution server 60 generates the state 62 is transmitted from the terminal devices 10 after the authentication. Accordingly, in an entry generated before the generation of an entry illustrated in FIG. 7A (an initial state, where there are no entries), the service name and the attribute information are stored as illustrated in FIG. 7B. Thereafter, as illustrated in FIG. 7C, according to a response message to the initial message the identifier 63 inserted into that response message is stored as identifier information. A generated entry is deleted when prescribed conditions are met. Those conditions may be defined corresponding to the time period during which the state 62 is to be maintained or may be a reception of a report indicating that the state 62 has been deleted.

On the tables 25 through 28 stored in the storage unit 24, the tables 25, 27, and 28 are prepared as fixed tables. However, the attribute/identifier information table 26 is updated by the GW device 20 as necessary as described above. Via this update, in the attribute/identifier information table 26, necessary information for extracting a message into which the identifier 63 is to be inserted from among messages transmitted from the terminal devices 10 and for inserting the identifier 63 into the extracted message (referred to as "identifier insertion information" hereinafter) is stored (registered). Accordingly, by referring to the table 26, the GW device 20 can insert the identifier 63 into a message that has to have the identifier 63 inserted into it.

Identifier insertion information stored in one entry on the table 26 includes the service name, attribute information, and identifier information. The service name can be stored because the video distribution server 60 can provide plural services. When the video distribution server 60 provides only one type of service, the name of that service does not have to be stored. Accordingly, for identifier insertion information, it is enough to include identifier information and attribute information.

Next, the units 21 through 23 illustrated in FIG. 2 will be specifically explained.

The message receiving/transmitting unit 21 relays messages that are transmitted and received between the terminal devices 10 and the SLBs 50. The terminal devices 10 used by an authenticated user transmit a message into which the artifact obtained by that authentication has been inserted. When a message into which an artifact has been inserted is received, the message receiving/transmitting unit 21 transmits to the SAML authentication server 30 an authentication query request, which is a message generated by using that artifact, and thereby obtains an authentication assertion. That authentication assertion is passed to the identifier extraction/insertion unit 23 together with the received message.

FIG. 10A illustrates an exemplary syntax of an authentication query request, and FIG. 10B illustrates an exemplary syntax of an authentication assertion. In FIG. 10A, "BBB" corresponds to an artifact. The message receiving/transmitting unit 21 generates an authentication query request as illustrated in FIG. 10A to transmit that request to the SAML authentication server 30, and thereby obtains an authentication assertion as illustrated in FIG. 10B. As illustrated in FIG. 4, in that authentication assertion, authentication unit used for authentication, an effective time period, and also attribute information such as the full name (CN), the terminal ID (TEID), the date of birth (DB), the city name (L), the prefecture name (ST), the country name (C), or the like is described.

The identifier extraction/insertion unit 23 refers to the service name extraction table 27 in FIG. 8, and identifies the communications protocol used by the passed message and the service (service name) requested by that message. By using the identification result, it is determined by referring to the session position extraction table 28 in FIG. 9 whether or not the identifier 63 (FIG. 12B or FIG. 13) has been inserted into the provided message. When it is determined that the identifier 63 has not been inserted, for example, the attribute type information of the service requested by the provided message is extracted from the attribute type information table 25 in FIG. 6, and it is determined whether or not all attribute information (attribute values) necessary for the provided authentication assertion 80 exists. When it is determined that all necessary information exists, the identified service name and the entry storing necessary attribute information are extracted from the attribute/identifier information table 26 in FIG. 7B or 7C. When it is determined that some attribute information is lacking, that fact is reported to the message receiving/transmitting unit 21.

Having been able to extract a corresponding entry, the identifier extraction/insertion unit 23 refers to the session position extraction table 28 illustrated in FIG. 9, and inserts into the passed message the identifier 63 that has been stored in that entry, and passes to the message receiving/transmitting unit 21 the message into which the identifier has been inserted. The fact that an entry was able to be extracted means that the user is trying to continuously use the currently used service even after changing the terminal devices 10. When a corresponding entry was not able to be extracted, the fact that the identifier 63 cannot be inserted is reported to the message receiving/transmitting unit 21.

Having received a report indicating that the identifier 63 has been inserted, the message receiving/transmitting unit 21 transmits a message to the corresponding SLB 50. Also, when a message was passed, the message receiving/transmitting unit 21 transmits that message to the corresponding SLB 50 in a similar manner. Messages transmitted using both ways above are transferred by the SLBs 50 to the video distribution server 60 that is to receive the transferred information on the basis of the inserted identifiers 63. Having received a report indicating that the identifier 63 cannot be inserted, the message receiving/transmitting unit 21 regards a message received from the terminal device 10 as an initial message, and transmits that message to the corresponding SLB 50. Thereby, the SLBs 50 use the automatic sorting function to select the video distribution server 60 to which messages are to be transferred.

Having received a report indicating the existence of lacking attribute information, the message receiving/transmitting unit 21 transmits, to the SAML authentication server 30, an attribute query request, which is a message generated by using an artifact, and transmits an attribute assertion. FIGS. 11A and 11B illustrate exemplary syntaxes of an attribute query request and an attribute assertion, respectively. In this attribute assertion, attribute information that does not exist in the authentication assertion 80 in FIG. 4 is described. The message receiving/transmitting unit 21 passes the obtained attribute assertion to the identifier extraction/insertion unit 23.

The present embodiment employs the above manner in which the GW device 20 first obtains the authentication assertion 80, and obtains the attribute assertion if necessary. Thereby, the frequency of message exchanges with the SAML authentication server 30 is lowered. Attribute type information (combination of attributes) for each service in the attribute type information table 25 is defined while taking into account the authentication assertion 80 and the attributes described in attribute assertion. Thus, the value of the attributes the combination of which is represented in the attribute type information is described in at least one of the authentication assertion 80 and the attribute assertion.

As illustrated in FIG. 6, a combination of necessary attributes is defined for each service. Thus, it is also possible to determine, in response to the service, the attribute combination whose value is described in each assertion. That is, it is also possible to configure that an assertion to be obtained is selected in response to the service, such as that only the authentication assertion 80 is obtained for a video distribute service and only an attribute assertion is obtained for a TV conference service.

The identifier extraction/insertion unit 23 to which an attribute assertion has been passed extracts, from the attribute/identifier information table 26 in FIG. 7C, the entry storing the identified service name and the necessary attribute information. When that entry was able to be extracted, the identifier extraction/insertion unit 23 refers to the session position extraction table 28 in FIG. 9, and inserts into the message the identifier 63 that has been stored in that entry (FIG. 12B or FIG. 13), and passes to the message receiving/transmitting unit 21 the message into which the identifier has been inserted. When the entry was not able to be extracted, the identifier extraction/insertion unit 23 reports the fact that the identifier 63 cannot be inserted to the message receiving/transmitting unit 21.

Having received a message passed from the identifier extraction/insertion unit 23, the message receiving/transmitting unit 21 transmits that message to the corresponding SLB 50. Thereby, the SLB 50 selects the video distribution server 60 identified from that identifier 63 inserted in the message as the destination of the message transfer. Having received a report indicating that the identifier 63 cannot be inserted, a message received from the terminal devices 10 is regarded as the initial message as described above, and the message is transmitted to the corresponding SLB 50. That message is passed to the inter-message relating table generation unit 22 together with an assertion that has already been obtained.

The inter-message relating table generation unit 22 generates (adds) one entry in the attribute/identifier information table 26, and stores information extracted from the passed message and the assertion, respectively, by referring to the tables 25, 27, and 28 illustrated in FIGS. 6, 8, 9, respectively. Thereby, as illustrated in FIG. 7B, in the generated entry, the service name and attribute information, which is a combination of the attribute values, is stored. Accordingly, the addition of an entry to the attribute/identifier information table 26 is conducted when an initial message is received.

A response message from the video distribution server 60 is transmitted to the GW device 20 via the SLB 50. The message receiving/transmitting unit 21 transmits the received response message to the terminal devices 10, and also passes the received message to the inter-message relating table generation unit 22.

The inter-message relating table generation unit 22 identifies the corresponding entry in the attribute/identifier information table 26 in FIG. 7B, on the basis of the passed response messages, and stores as identified information, in the identified entry, the identifier 63 extracted from among those response messages by referring to the session position extraction table 28 in FIG. 9. The identification of the corresponding entry can be performed by storing the service requested by, for example, the massage that triggered the generation of the entry, and the transmission source address of that message.

As described above, having received a message from the terminal devices 10 that is not to be regarded as an initial message, the GW device 20 identifies the identifier 63 that is to be inserted on the basis of the assertion attribute value obtained from the artifact of that message, and inserts that identifier 63. Accordingly, the message into which the identifier 63 has been inserted is transferred to the video distribution server 60 to which the message is to be transferred by the uniqueness guarantee function of the SLB 50. The video distribution server 60 to which the message has been transferred is processed as if it is in the state (session) 62 that already exists, by the identifier 63. Thus, even when the terminal devices 10 are exchanged, the user can continuously use the service that he or she has been using. This makes it possible to use a service continuously in chronological order as illustrated in, for example, FIG. 3. This applies to a system configuration in which the SLBs 50 do not sort message transfer destinations.

When attribute information is obtained using an artifact, the GW device 20 stores only necessary data. It is made to be unnecessary to handle the data of people who are not using service, so that the load on the GW device 20 is suppressed.

Thus, in the present embodiment, an artifact is used to obtain necessary attribute information.

The above message receiving/transmitting unit 21, the inter-message relating table generation unit 22, and the identifier extraction/insertion unit 23 are implemented by the GW device 20 executing a program for relaying messages (relay program). By referring to FIG. 15, a specific explanation will be given for a computer that can be used as the GW device 20 by executing that relay program, i.e., a computer to which the present embodiment can be applied.

The computer illustrated in FIG. 15 includes a CPU 91, a memory device 92, an input device 93, an output device 94, an external storage device 95, a medium driving device 96, and a network connection device 97, all of which are connected to each other through a bus 98. The configuration illustrated in FIG. 15 is only an example, and this example does not have a limiting intention. For example, when the computer is connected to the service processing system 40 and to the terminal devices 10 through different communications networks, the computer includes plural network connection devices 97.

The CPU 91 controls the entire computer.

The memory device 92 is semiconductor memory such as RAM or the like that temporarily stores programs or data stored in the external storage device 95 (or a non-transitory portable storage medium 99) when such programs are to be executed, data is to be updated, or the like. The CPU 91 controls the entire computer by reading programs into the memory 92 and executing it.

The input device 93 is an interface such as a keyboard, a mouse, or the like that can be connected to an operation device. The input device 93 detects operations made by the user on the connected operation device, and reports the detection results to the CPU 91.

The output device 94 is a display control device connected to, for example, a display device. The network connection device 97 is for realizing communications with, for example, the service processing system 40 and the terminal devices 10 through a communications network. The external storage device 95 is, for example, a hard disk device. This is used mainly for storing various data and programs.

The medium driving device 96 accesses the non-transitory portable storage medium 99 such as an optical disk or a magneto-optical disk or the like.

The above relay program is stored in the external storage device 95 or the non-transitory portable storage medium 99, or can be obtained by the network connection device 97 through a communications network. By the CPU 91 reading that relay program into the memory device 92 to execute it, the GW device 20 is implemented. When the relay program is assumed to be stored in the external storage device 95, the message receiving/transmitting unit 21 is implemented by, for example, the CPU 91, the memory device 92, the external storage device 95, the network connection device 97, and the bus 98. Further, when the storage unit 24 is assumed to be the external storage device 95, the inter-message relating table generation unit 22 is realized by, for example, the CPU 91, the memory device 92, the external storage device 95, and the bus 98. This applies to the identifier extraction/insertion unit 23.

FIG. 4 is a sequence diagram illustrating exemplary operations of the mobile terminal device 11, the PC 12, the SLBs 50, the SAML authentication server 30, and the video distribution servers 60. This sequence diagram is of an example in which a user uses the same service continuously while changing the terminal devices 10 from the mobile terminal device 11 to the PC 12. Next, by referring to FIG. 4, specific explanations will be given for operations of the respective devices in this case.

In FIG. 4, the attribute/identifier information table is denoted by "TBL-2". This applies to FIGS. 5 and 14. The SLB 50*a* dedicated to SIP and the SLB 50*b* dedicated to http are denoted by "SLB-A" and "SLB-B", respectively.

When a service is to be used through the mobile terminal device 11, the user accesses the SAML authentication server 30 so as to be authenticated (not illustrated). This authentication is performed for example as described below with a challenge-response method being employed.

First, the mobile terminal device 11 transmits to the SAML authentication server 30 a REGISTER message to which ID/password has not been added. The SAML authentication server receives that message, and transmits an error message requesting authentication information (401 Unauthenticated) to the mobile terminal device 11. Having received that error message, the mobile terminal device 11 again transmits to the SAML authentication server 30 a message in which the authentication header stores authentication information. The SAML authentication server 30 confirms whether or not the combination of the ID/password represented by the authentication information in the message is registered in the authentication information DB 35 and thereby authentication is performed. When the registration of the ID/password was confirmed, an artifact is issued, and a message is reported to the mobile terminal device 11. Also, one entry is generated (added) in the authentication assertion information table 36, and the issued artifact and the storage location information of each generated assertion are stored in that entry. When the registration of the ID/password was not able to be confirmed, the above error message is transmitted to the mobile terminal device 11 again.

After the authentication is finished as above, it is made possible to request the provision of a service from the mobile terminal device 11. That request is made by transmitting a message into which an artifact has been inserted (initial message) (sequence S1-3). That message is received by the GW device 20, and the GW device 20 generates an authentication query request into which the artifact in the message has been inserted, and transmits the request to the SAML authentication server 30, and thereby performs artifact verification (sequence S1-4). Having received that authentication query request, the SAML authentication server 30 refers the authentication assertion information table 36, and transmits the requested authentication assertion 80 to the GW device 20 (sequence S1-5).

The GW device 20 that has received the authentication assertion 80 extracts attribute information (attribute value) described in that assertion 80, and confirms whether or not the identifier 63 that has to be inserted into the received message exists by referring to the attribute/identifier information table 26. In this example, the received message corresponds to an initial message. Thus, the GW device 20 transmits the message to the SLB 50*a* dedicated to SIP without inserting the identifier 63 into the received message. Thereby, the SLB 50*a* transfers the message to the video distribution server 60 selected by the automatic sorting function (sequence S1-6). Also, the GW device 20 generates one entry in the attribute/identifier information table 26, and stores the service name and the attribute information.

Having received an initial message, the video distribution server 60 generates the state 62, assigns the identifier 63 to it, and transmits to the SLB 50*a* a response message into which that identifier 63 has been inserted. The SLB 50*a* receives that response message, and transmits it to the GW device 20 (sequence S1-7). The GW device 20 transmits the received response message to the mobile terminal device 11, and extracts the identifier 63 from that response message in order to store the identifier 63 in the corresponding entry on the attribute/identifier information table 26 (sequence S1-8).

When the user changes from the mobile terminal device 11 to the PC 12 to use the same service, the PC 12 transmits a message requesting provision of the service (sequence S2-3). An artifact has not been inserted into that message. Accordingly, having received that message, the GW device 20 makes the SAML authentication server 30 perform authentication. This authentication is performed by making the PC 12 access the SAML authentication server 30 by, for example, redirecting (sequence S2-4).

The GW device 20 reports the transfer destination to the PC 12 by redirecting. In response to that report, the PC 12 accesses the SAML authentication server 30 as the transfer destination, and the SAML authentication server 30 requests authentication information. In response to that request, the PC 12 transmits the authentication information to the SAML authentication server 30. Thereby, the SAML authentication server 30, similarly to the case of SIP, performs authentication by confirming whether or not the combination of the ID/password represented by the received authentication information is registered in the authentication information DB 35. When the ID/password has been confirmed to be registered, an artifact is issued, and this artifact is reported to the PC 12 through a message. In response to this issuance of the artifact, an artifact for the same user (user A) is stored for each terminal device 10 on the authentication assertion information table 36 as illustrated in FIG. 1.

When an authentication has been finished as described above, the PC 12 transmits a message, into which an artifact has been inserted, requesting the service provision. Having received that message, the GW device 20 generates an authentication query request into which the artifact in the message has been inserted, and transmits the request to the SAML authentication server 30 so as to perform artifact verification (sequence S1-4). Having received that authentication query request, the SAML authentication server 30 refers to the authentication assertion information table 36, and transmits the requested authentication assertion 80 to the GW device 20 (sequence S1-5).

The GW device 20 that has received the authentication assertion 80 extracts the attribute information described in that authentication assertion 80, and refers to the attribute/identifier information table 26 so as to confirm whether or not there is an identifier 63 that has to be inserted into the received message. In this example, the received message is a message transmitted from the PC 12 used by the same user even if he or she has changed the terminal devices 10. The entry corresponding to that user exists on the attribute/identifier information table 26. Thus, the GW device 20 inserts the identifier 63 that has to be inserted into the received message ("α1" in FIG. 4) as illustrated in, for example, FIG. 13, and transmits it to the SLB 50*b* dedicated to HTTP. In the SLB 50*b*, the corresponding uniqueness guarantee information is registered by the setting management device 70. Thus, the SLB 50*b* transfers the message to the video distribution server 60 selected in accordance with the uniqueness guarantee information (sequence S2-6).

As described above, when the same service is received and the user has changed the terminal devices 10, the message from the terminal device 10 that is used after the changing is transferred, with the same identifier 63 being inserted into it, to the video distribution server 60 to which the message of the first terminal device 10 was transferred. Thus, the user can continuously use the service even when he or she has changed the terminal devices 10.

Figure 5:
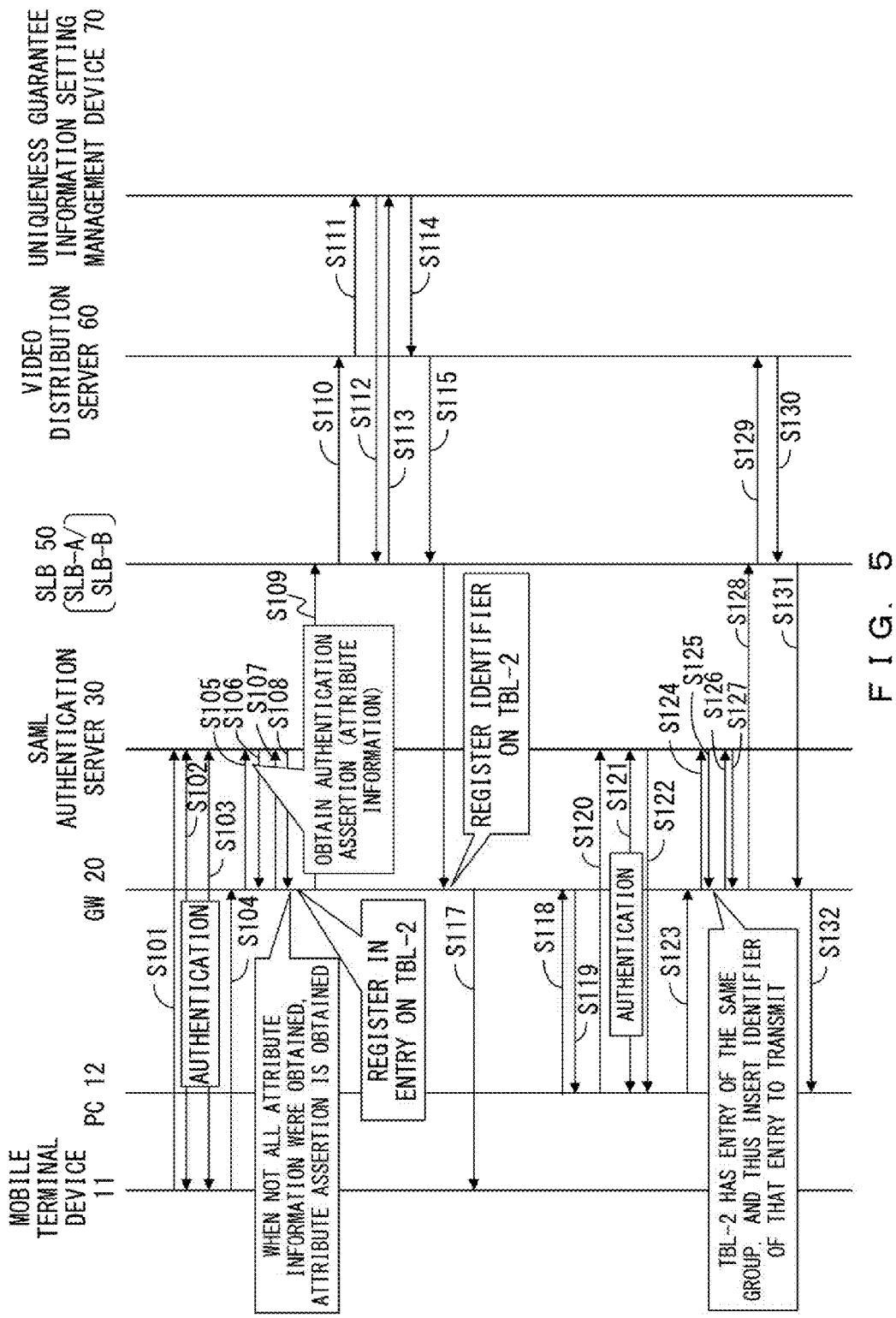
FIG. 5 is a sequence diagram illustrating exemplary operations of the mobile terminal device, the PC, each SLB, the SAML authentication server, the video distribution server, and the uniqueness guarantee information setting management device.

FIG. 5 is a sequence diagram illustrating exemplary operations of the mobile terminal device 11, the PC 12, the respective SLBs 50, the SAML authentication server 30, the video distribution server 60, and the uniqueness guarantee information setting management device 70. This sequence diagram illustrates, similarly to FIG. 4, a case where the user changes the terminal devices 10 from the mobile terminal device 11 to the PC 12 while using the same service. Next, by referring to FIG. 5, the operation of the respective devices including the setting management device 70 will be specifically explained.

First, the mobile terminal device 11 transmits, to the SAML authentication server 30, a REGISTER message to which an ID/password is not added (sequence S101). In response to the reception of that message, the SAML authentication server 30 transmits to the mobile terminal device 11 an error message (401 Unauthenticated) that requests authentication information (sequence S102).

Having received that error message, the mobile terminal device 11 again transmits to the SAML authentication server 30 the message with its authentication header storing the authentication information, in accordance with operations by the user. The SAML authentication server 30 performs authentication by confirming whether or not the combination of the ID/password represented by the authentication information in the message is registered in the authentication information DB 35. When the ID/password has been confirmed to have been registered as a result of the authentication, an artifact is issued, and this artifact is reported to the mobile terminal device 11 through a message. When the registration of the ID/password was not able be confirmed, the above error message is again transmitted to the mobile terminal device 11. In sequence 5103, messages are transmitted and received for authentication as described above. When the registration of the ID/password was able to be confirmed, the SAML authentication server 30 generates (adds) one entry on the authentication assertion information table 36, and stores the issued artifact and the storage location information of each assertion generated in the entry.

After the authentication is finished as above, the mobile terminal device 11 transmits a message, into which an artifact has been inserted, requesting the service provision (initial message) (sequence S104). Having received this message, the GW device 20 generates an authentication query request into which the artifact in the message has been inserted, and transmits the request to the SAML authentication server 30 (sequence S105). Having received that authentication query request, the SAML authentication server 30 refers to the authentication assertion information table 36, and transmits the requested authentication assertion 80 to the GW device 20 (sequence S106).

The GW device 20 that has received the authentication assertion 80 extracts the attribute information described in that assertion 80, and refers to the attribute type information table 25 illustrated in FIG. 6 by using the service name identified from the received message so as to determine whether or not all necessary attribute information exists. When it is determined that there is lacking attribute information, the GW device 20 generates an attribute query request and transmits it again to the SAML authentication server 30 (sequence S107). The SAML authentication server 30 that has received the attribute query request refers to the authentication assertion information table 36, and transmits the requested attribute assertion to the GW device 20 (sequence S108).

The GW device 20 extracts the lacking attribute information from the received attribute assertion, and refers to the attribute/identifier information table 26 in FIG. 7B or 7C by using the service name identified from the received message and all of the extracted attribute information so as to identify the corresponding entry. In this example, an entry cannot be identified because the message received from the mobile terminal device 11 corresponds to the initial message. As a result of this, the GW device 20 transmits to the corresponding SLB 50a the received message without inserting the identifier 63 into it (sequence S109). The GW device 20 generates one entry on an attribute/identifier information table 27, and stores the service name and the attribute information (the value of each attribute designated) as well. The SLB 50a transfers the received message to the video distribution server 60 selected by the automatic sorting function (sequence S110).

The video distribution server 60 that has received the initial message generates the state (session) 62, and assigns the identifier 63 to the state 62, and reports to the setting management device 70 the session information related to the generated state (session) 62 (sequence S111). That report is made under control of a session information monitoring/reporting unit 61a included in the application 61 to be executed by the server 60. The uniqueness guarantee information setting management device 70 generates uniqueness guarantee information, which is a combination of the identifier 60 in the reported session information and the information indicating the video distribution server 60 that reported the session information, and transmits the uniqueness guarantee information to each SLB 50 (Sequence S112). Each SLB 50 registers the received uniqueness guarantee information, and returns the fact of the registration (sequence S113). Having received the return, the setting management device 70 reports to the video distribution server 60 the fact that the setting of the uniqueness guarantee information has been completed (sequence S114). The video distribution server 60 waits until it receives the report, and transmits a corresponding message to the corresponding SLB 50a (sequence S115).

The SLB 50a transmits the received response message to the GW device 20 (sequence S116). The GW device 20 transmits the received response message to the mobile terminal device 11 (sequence S117). Also, the SLB 50a extracts the identifier 63 from that response message, and stores it in the corresponding entry on the attribute/identifier information table 26. Thereafter, the messages transmitted from the mobile terminal device 11 are transferred to the corresponding SLB 50a without the identifier 63 being inserted into the messages by the GW device 20, and are transferred to the same video distribution server 60 by that SLB 50a.

When the user uses the same service while changing from the mobile terminal device 11 to the PC 12, the PC 12 transmits a message requesting the provision of the service (sequence S118). An artifact is not inserted into this message. On the basis of this fact, the GW device 20, when receiving this message, transmits a response message for purposes of redirecting to the PC 12 (sequence S118). Thereby, the PC 12 transmits a message to the SAML authentication server 30 designated by the received response message (sequence S120).

The SAML authentication server 30 that has received the message requests authentication information from the PC 12, and in response to that request, the PC 12 transmits authentication information to the SAML authentication server 30. Thereby, similarly to the case of the mobile terminal device 11 (SIP), the SAML authentication server 30 confirms whether or not the combination of the ID/password represented by the received authentication information is registered in the authentication information DB 35 so as to perform authentication. In sequence S121, messages are transmitted and received for this authentication. When the registration of the ID/password has been confirmed by the authentication result, the SAML authentication server 30 transmits to the PC 12 a message into which an artifact has been inserted (sequence S122). One entry is generated (added) on the authentication assertion information table 36, and the issued artifact and the storage location information of each assertion generated are stored in that entry.

Having obtained the artifact as described above, the PC 12 transmits a message into which the obtained artifact has been inserted (sequence S123). The GW device 20, having received that message, generates an authentication query request into which the artifact in the message has been inserted, and transmits the request to the SAML authentication server 30 (sequence S124). The SAML authentication server 30, having received that authentication query request, refers to the authentication assertion information table 36, and transmits the requested authentication assertion 80 to the GW device 20 (sequence S125).

The GW device 20 that has received the authentication assertion 80 extracts the attribute information described in that assertion 80, and refers to the attribute type information table 25 illustrated in FIG. 6 by using the service name identified from the received message, and thereby determines whether or not all necessary attribute information (all attribute values) exists. When it is determined that some attribute information is lacking, an attribute query request is generated and the request is again transmitted to the SAML authentication server 30 (sequence S126). Having received that attribute query request, the SAML authentication server 30 refers to the authentication assertion information table 36, and transmits the requested attribute assertion to the GW device (sequence S127).

The GW device 20 extracts the lacking attribute information from the received attribute assertion, and refers to the attribute/identifier information table 26 in FIG. 7B or 7C by using the service name identified from the received message and all extracted attribute information so as to identify the corresponding entry. In this situation, the user was using the service through the mobile terminal device 11 before using the PC 12. Accordingly, the entry can be identified. As a result of this, the identifier 63 stored in the identified entry is inserted into the received message, and the message is transmitted to the corresponding SLB 50 (sequence 128). According to the uniqueness guarantee information, the SLB 50 transfers the received message to the video distribution servers 60 to which the message has to be transferred (sequence S129). The video distribution servers 60 transmit to the corresponding SLB 50 the response message of the received message (sequence S130). The SLB 50 transfers to the GW device 20 the response message received from the video distribution servers 60 (sequence S131), and the GW device 20 transmits the transferred response message to the PC 12 (sequence 132).

Having received the response message, the PC 12 inserts the identifier 63 into a related message to be transmitted later. Thus, the GW device 20 thereafter relays messages received from the PC 12 without inserting the identifier 63.

FIG. 14 is a flowchart for a message relay process. This flowchart extracts and illustrates the flow of the process executed for responding to one message (request message) transmitted from the terminal devices 10 to facilitate understanding. Next, detailed explanations will be given for the operations of the GW device 20 by referring to FIG. 14. The message relay process illustrated as the flowchart in FIG. 14 is implemented by the CPU in the GW device 20 executing the above relay program.

First, in step S201, a message (request message) transmitted from the terminal devices 10 is received. In step S202, the communication protocol used by that received message and the requested service are identified by referring to the service name extraction table 27 illustrated in FIG. 8, and it is confirmed by referring to a session position extraction table 29 in FIG. 9 whether or not there is an identifier 63. When the presence of the identifier 63 is confirmed, the received message is transmitted to the corresponding SLB 50, although this process is not illustrated in the figure, and the message relay process is terminated. When the identifier 63 was not able to be confirmed, the process proceeds to step S203.

In step S203, it is confirmed by extracting the artifact from the received message whether or not the user who had transmitted the message was authenticated. A message transmitted from the terminal devices 10 after the user has been authenticated has an artifact inserted in it. Accordingly, when an artifact was able to be extracted from the received message, the determination result is YES, and the process proceeds to step S208. When an artifact was not able to be extracted, the determination result is NO, and the process proceeds to step S207, and a message for purposes of redirecting is transmitted to the terminal devices 10 so as to access the terminal devices 10 to the SAML authentication server 30, and thereafter, this message relay process is terminated.

In step S208, an authentication query request (FIG. 10A) is generated by using the extracted artifact, and the request is transmitted to the SAML authentication server 30. After transmitting the authentication query request, the process proceeds to step S209, and waits until the authentication assertion 80 (FIGS. 4 and 10B) is received from the SAML authentication server 30. After receiving the authentication assertion 80, the process proceeds to step S210.

In step S210, the service name extracted in step S202 is used for referring to the attribute type information table (described as "TBL-1" in FIG. 14) 25 in FIG. 6, so as to obtain necessary attribute value from the authentication assertion 80. In the attribute type information table 25, attribute type information representing a combination of necessary attribute information (attribute values) (denoted by "attribute group" in FIG. 14) is defined for each service. In step S211, whether or not all attribute values represented by the corresponding attribute type information have been obtained is determined. When there is a lacking attribute value, the determination result is NO, and the process proceeds to step S212, and an attribute query request (FIG. 11A) is generated and transmitted to the SAML authentication server 30 so as to wait until the attribute assertion (FIG. 11B) is received, and then the process proceeds to step S213. When all necessary attribute values have been obtained, the determination result is YES, and the process proceeds to step S213.

In step S213, the identified service name and the obtained attribute values are used for referring to the attribute/identifier information table 26 illustrated in FIG. 7B or 7C, and thereby whether or not there is an entry storing that service name and the obtained attribute values is determined. When there is such an entry, the determination result is YES, the process proceeds to step S214, the identifier 63 of that entry is added to the received message (denoted by "MSG" in FIG. 14), that message is transmitted to the corresponding SLB 50, and thereafter this message relay process is terminated. The identifier 63 is added as illustrated in FIG. 12B or 13 in accordance with the communications protocol of the message. When there are no such entries, the determination result is NO, and the process proceeds to step S215.

The process proceeding to step S215 means that the received message is an initial message. Thus, in and after step S215, a process for responding to initial messages is executed.

In step S215, a new entry is registered on the attribute/identifier information table 26, and the identified service name and all attribute values obtained are stored in that entry. In step S216, the received message (initial message) is transmitted to the corresponding SLB 50, i.e., to the SLB 50 that uses the identified communications protocol. Thereafter, the process proceeds to step S217, and waits until the response message returned in response to transmitting the message is received. Thereby, the process proceeds to step S218, after receiving the response message (MSG).

In step S218, the session position extraction table 28 illustrated in FIG. 9 is referred to, and the identifier 63 is extracted from the response message, and the extracted identifier 63 is stored in an entry that was registered newly in step S215. In step S219, the response message is transmitted to the terminal devices 10, and after that transmission, the message relay process is terminated.

In the present embodiment, a relay device that inserts an identifier into a message from the terminal device 10 as necessary is implemented as the GW device 20; however, the device to which the present embodiment can be applied is not limited to the GW device 20. The present embodiment can be applied widely to devices that are located between the terminal devices 10 and a server that provides services. Thus, it is also possible to install a relay device according to the present embodiment in the SLB 50.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A relay device that relays a message transmitted from a terminal device to a server through a communications network, comprising:
   an attribute information obtaining unit configured to obtain attribute information related to a user of the terminal device from which the message was received;
   an identifier obtaining unit configured to obtain an identifier inserted into a message to the terminal device by a server that generates a session in response to the message from the terminal device, the identifier being for identifying the session;
   an information storage unit configured to store the identifier that is obtained by the identifier obtaining unit and that is associated with the attribute information obtained by the attribute information obtaining unit;
   a first determination unit configured to determine whether or not the information storage unit stores attribute information coincident to the obtained attribute information when the attribute information obtaining unit obtained the attribute information;
   an identifier insertion unit configured to insert an identifier associated with the attribute information into a message that triggered obtainment of attribute information by the attribute information obtaining unit when the determination unit determined that the information storage unit stores attribute information coincident to the attribute information obtained by the attribute information obtaining unit;
   a relay unit configured to transmit a message into which the identifier insertion unit inserted an identifier;
   a second determination unit configured to determine whether or not, in an attribute type information table in which a name of a service is associated with attribute information used for the service, all attribute information used for the service associated with a name of a service specified by the message is included in the attribute information obtained by the attribute information obtaining unit; and
   a reception unit configured to generate and send an attribute inquiry request to an authentication server when there is any missing attribute information, thereby receiving missing attribute information.

2. The relay device according to claim 1, wherein:
   the information storage unit is configured to store the identifier and the attribute information that are associated with a service provided by the server in response to the message into which the identifier was inserted.

3. The relay device according to claim 1, wherein:
   the attribute information obtaining unit obtains attribute information related to the user by using authentication information indicating that the user of the terminal device has been authenticated.

4. The relay device according to claim 1, wherein:
   the identifier insertion unit determines a communications protocol used by the message received from the terminal device, and determines a session position that is associated with the determined communications protocol, in a session position extraction table where a plurality of communications protocols are associated with a plurality of session positions at which the identifier is inserted into the message, as a position at which the identifier is inserted into the message.

5. A service continuation method for different terminal devices, by which a service provided by a server through a communications network to a user of a terminal device can continuously be used by a different terminal device used by the user, comprising:
   causing a relay device that relays a message transmitted from the terminal device to the server through the communications network to obtain attribute information related to the user of the terminal device when the message was received from the terminal device:
      to obtain an identifier inserted into a message to the terminal device by a server that generates a session in response to the message from the terminal device, the identifier being for identifying the session;
      to store the identifier that is associated with the attribute information related to the user of the terminal device that transmits the message into which the identifier was inserted;
      to determine whether or not the attribute information coincident to attribute information obtained in response to reception of a message is stored, when the message is received from the terminal device;
      to insert an identifier associated with the coincident attribute information into a message received from the terminal device, when it is determined that the coincident attribute information is stored, and to relay the message by transmitting the message;
      to determine whether or not, in an attribute type information table in which a name of a service is associated with attribute information used for the service, all attribute information used for the service associated with a name of a service specified by the message is included in the obtained attribute information; and to generate and send an attribute inquiry request to an authentication server when there is any missing attribute information, thereby receiving missing attribute information.

6. The service continuation method for different terminal devices according to claim 5, comprising:

identifying the service provided by the server in response to the message that triggers obtainment of the attribute information, and storing the identified service associated with the attribute information.

7. The service continuation method for different terminal devices according to claim 5, wherein:

the attribute information is obtained by using authentication information indicating that the user of the terminal device has been authenticated.

8. A computer-readable non-transitory storage medium for storing a program to cause a computer used as a relay device that relays a message transmitted from a terminal device to a server through a communications network to execute a procedure, the procedure comprising:

obtaining attribute information related to a user of the terminal device from which the message was received;

obtaining an identifier inserted into a message to the terminal device by a server that generates a session in response to the message from the terminal device, the identifier being for identifying the session;

storing the identifier that is obtained by the obtaining the identifier and that is associated with the attribute information obtained by the obtaining the attribute information;

when the obtaining the attribute information obtains attribute information, determining whether or not attribute information coincident to the obtained attribute information is stored by the storing the identifier;

inserting an identifier associated with the attribute information into a message that triggered obtainment of attribute information by the obtaining the attribute information when the determining determined that the storing the identifier stores attribute information coincident to the attribute information obtained by the obtaining the attribute information;

transmitting a message into which the inserting the identifier inserted an identifier;

determining whether or not, in an attribute type information table in which a name of a service is associated with attribute information used for the service, all attribute information used for the service associated with a name of a service specified by the message is included in the attribute information obtained by the obtaining attribute information; and generating and send an attribute inquiry request to an authentication server when there is any missing attribute information, thereby receiving missing attribute information.

* * * * *